March 28, 1961  A. V. RAYMOND  2,976,972
CLIP
Filed Jan. 21, 1958  2 Sheets-Sheet 1

INVENTOR:
ALBERT V. RAYMOND,
BY Philip E. Parker
ATTORNEY,

March 28, 1961 A. V. RAYMOND 2,976,972
CLIP

Filed Jan. 21, 1958 2 Sheets-Sheet 2

INVENTOR:
ALBERT V. RAYMOND,
BY Philip E. Parker
ATTORNEY.

United States Patent Office 2,976,972
Patented Mar. 28, 1961

2,976,972
CLIP

Albert V. Raymond, 129 Cours Berriat, Grenoble, France

Filed Jan. 21, 1958, Ser. No. 710,235

Claims priority, application France Jan. 29, 1957

1 Claim. (Cl. 189—88)

This invention relates to fastening devices and in particular to a clip for attaching trim molding or the like to a panel.

In the construction of automobiles, molding strips made up of a section of light alloy, chromed brass, stainless steel or plastic material are often used to decorate the edges of automobile windows or windshields and to conceal entirely or partially the rubber mounting gasket.

In a method of installation presently used, the molding strips are generally secured to the rubber gasket, no provision being made to conceal the sheet metal frame adjacent the gasket.

The object of the present invention is to provide a fastening clip for mounting the molding strip so that the molding strip conceals not only all or part of the rubber gasket, but also the sheet metal frame adjacent the gasket.

Other objects of the invention will, in part, be obvious, and will, in part, appear hereinafter.

Figure 1:
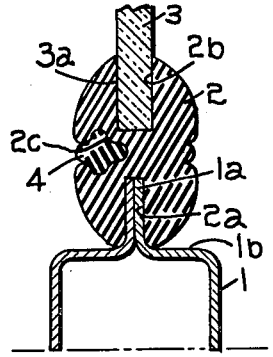
Fig. 1 is a view in cross section showing a mounting of a glass window in accordance with the usual practice.

Referring to the drawings, it will be seen as illustrated in Fig. 1 that automobile windshields are generally mounted on the sheet metal frame 1 by means of a flexible rubber sealing strip or gasket 2 presenting two opposed grooves 2a and 2b that enclose respectively a rib 1a of the frame 1 and the edge 3a of the windshield 3. The sealing strip 2 has in addition, a longitudinal cavity 2c in which a locking member 4, made of hard rubber or the like, is inserted so as to lock the sealing strip on the windshield and into the frame.

Figure 3:
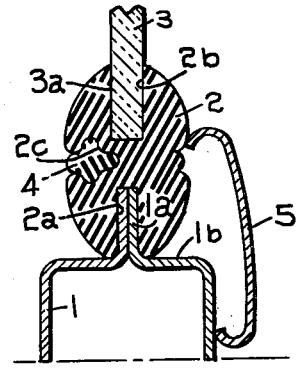
Fig. 3 is a view in cross-section showing the relationship of the molding with respect to the frame and the joint between the clip and the frame.

In order to conceal the joint that exists between the windshield, the sealing strip and the frame, or simply between the sealing strip and the frame, a metal molding strip 5 is placed as shown in Fig. 3, in front of this joint.

Figure 2:
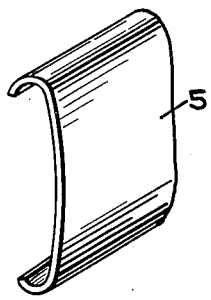
Fig. 2 is a view in perspective of a molding strip.

The molding strip 5 can be of any suitable shape, for example, having a cross section in the shape of a C, as shown in Fig. 2. The clip that is the subject of the present invention, serves to keep the molding strip in position and it is essentially made up of two portions 6 and 7 that are formed from a piece of resilient sheet metal. Portion 6 is formed in the shape of a U whose arms are approximately equal in length to the height of the rib 1a of the frame 1 or chassis and the distance between the arms equal to the width of this rib.

Figure 7:
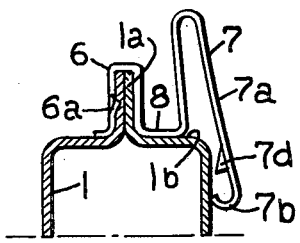
Figure 8:
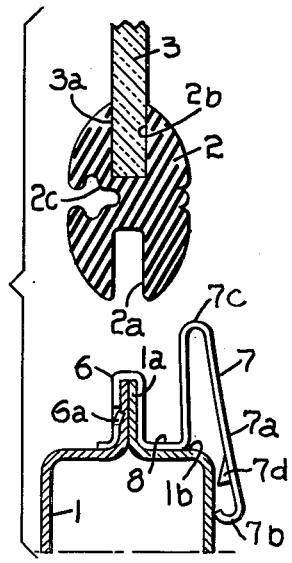

At least one of these arms is provided with teeth 6a that are cut from the marginal edge and directed obliquely to the base of the U in order to insure a good grip between portion 6 and the rib 1a as illustrated in Fig. 7. The second portion 7 of the clip is joined to the first portion 6 by a connecting portion 8 substantially at right angles thereto and rests on the plate 1b of the frame 1 when the clip is in position.

Figure 4:
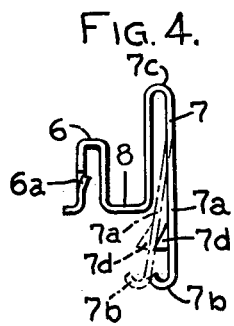
Fig. 4 is a view in elevation of the clip of my invention.
Figure 6:
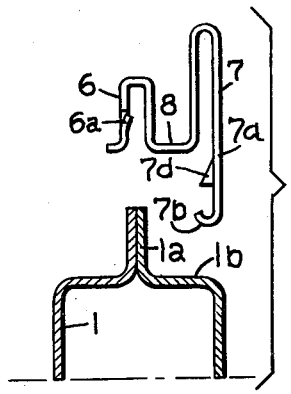
Figs. 6–11 are views in cross section illustrating successive steps in mounting the clip, the pane of glass and the molding strip.
Figure 5:
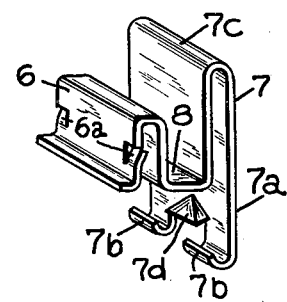
Fig. 5 is a view in perspective of the clip.

This second portion is similarly bent into the shape of a U with the outer arm 7a extended beyond portion 8 and terminating in a rounded edge 7b. The arm 7a can be drawn closer to portion 8, as it has been represented in dotted lines in Fig. 4, so as to increase the pressure of the clip on the frame 1. When the clip is in place, as shown in Figs. 7 to 10, the arm 7a comes to rest with the edge 7b on the sealing strip 2.

After the desired number of clips have been put into place on the frame, the windshield 3 to which the sealing strip, devoid of its fixing piece 4, is mounted on the rib 1a bearing the clips, the locking member 4 is then pressed into the groove 2c. The molding strip 5 snaps into engagement on portion 7, utilizing the resiliency of the parts that are to be joined.

Figure 9:
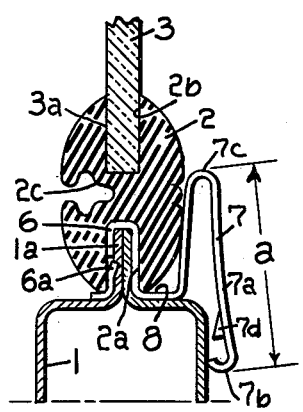
Figure 10:
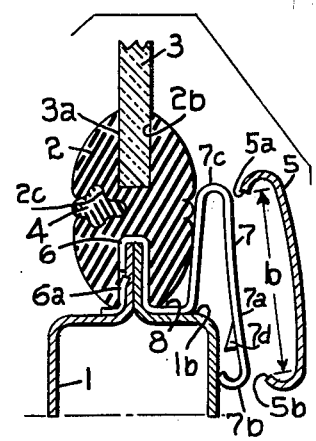
Figure 11:
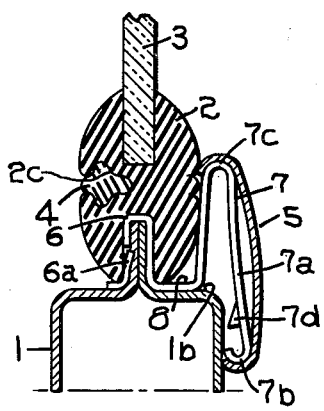
Figure 12:
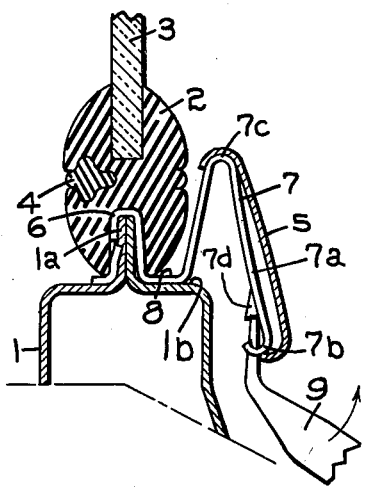
Fig. 12 is a view in cross-section showing the method of removing the molding strip.

In this respect, it should be pointed out that in order to obtain a good attachment, the distance $a$ between the outer edge of rim 7b from the top 7c as shown in Fig. 9, should be slightly greater than the distance $b$ as shown in Fig. 10 between the interior edges 5a and 5b of the molding strip.

In order to permit the removal of the molding strip, there is provided at the base of side 7a and in the edge 7b, a cavity that is open near the base and which allows a prying tool 9 or the like to be inserted so that force may be applied to the molding strip 5 in order to remove it.

Since certain other obvious modifications may be made in this device without departing from the scope of the invention, it is intended that all matters contained herein be interpreted in an illustrative and not in a limiting sense.

I claim:

An assembly for a molding strip and the like comprising, in combination, a body portion having an upstanding flange portion, a flexible sealing strip engaging said flange portion, a molding strip having opposed inturned flanges, said molding strip engaging said body portion and said sealing strip covering a joint between them and a fastener device mounted on said flange portion and holding said molding strip in position, said fastening device including a U-shaped flange gripping portion having two opposed legs connected by a bight portion and in gripping engagement with opposite faces of the flange portion of the body portion, a connecting portion extending from one of the legs opposite the bight portion and connecting with a leg of a second U-shaped portion opposite the bight portion thereof, the free end of the other leg being curled over and forming a rolled edge engaged within an inturned flange on one side of the molding strip while the other inturned flange of the molding strip is hooked over the bight portion of said second U-shaped portion, the said U-shaped portions being substantially parallel and spaced from each other.

References Cited in the file of this patent

UNITED STATES PATENTS

| 2,184,255 | Kral | Dec. 19, 1939 |
| 2,229,233 | Wiley | Jan. 21, 1941 |

FOREIGN PATENTS

| 765,193 | France | Mar. 19, 1934 |